US010409712B2

(12) United States Patent
Dwarakanath et al.

(10) Patent No.: US 10,409,712 B2
(45) Date of Patent: Sep. 10, 2019

(54) DEVICE BASED VISUAL TEST AUTOMATION

(71) Applicant: Accenture Global Solutions Limited, Dublin (IE)

(72) Inventors: Anurag Dwarakanath, Bangalore (IN); Neville Dubash, Mumbai (IN); Sanjay Podder, Thane (IN)

(73) Assignee: Accenture Global Solutions Limited, Dublin (IE)

( * ) Notice: Subject to any disclaimer, the term of this patent is extended or adjusted under 35 U.S.C. 154(b) by 281 days.

(21) Appl. No.: 15/395,452

(22) Filed: Dec. 30, 2016

(65) Prior Publication Data
US 2018/0189170 A1    Jul. 5, 2018

(51) Int. Cl.
| | |
|---|---|
| *G06F 11/36* | (2006.01) |
| *G06F 9/44* | (2018.01) |
| *G06F 17/30* | (2006.01) |
| *G06T 7/70* | (2017.01) |
| *G06K 9/34* | (2006.01) |
| *G06K 9/62* | (2006.01) |
| *G06K 9/66* | (2006.01) |
| *G06N 3/08* | (2006.01) |
| *G06F 9/451* | (2018.01) |

(52) U.S. Cl.
CPC ...... *G06F 11/3692* (2013.01); *G06F 11/3664* (2013.01); *G06F 11/3684* (2013.01); *G06F 11/3688* (2013.01); *G06K 9/344* (2013.01); *G06K 9/6256* (2013.01); *G06K 9/6267* (2013.01); *G06K 9/66* (2013.01); *G06N 3/08* (2013.01); *G06T 7/70* (2017.01); *G06F 9/451* (2018.02); *G06K 2209/01* (2013.01)

(58) Field of Classification Search
CPC ............. G06F 11/3692; G06F 11/3664; G06F 11/3684; G06F 11/3688; G06F 16/951; G06F 16/2455; G06Q 30/06; G06Q 30/0603; G06Q 30/0605
See application file for complete search history.

(56) References Cited

U.S. PATENT DOCUMENTS 9,047,413 B2 * 6/2015 Romdhane .......... G06F 11/3684
9,189,378 B1 * 11/2015 Ryan .................... G06F 11/3664
(Continued)

OTHER PUBLICATIONS

Chang et al., GUI testing using computer vision, 10 pages (Year: 2010).*
(Continued)

*Primary Examiner* — Thuy Dao
(74) *Attorney, Agent, or Firm* — Harrity & Harrity, LLP

(57) ABSTRACT

A device may receive test scripts that include first information identifying first elements of user interfaces or second information identifying test steps. The test scripts may be written in first text or first program code. The device may process the first text or the first program code of the test scripts. The device may identify the first elements on the user interfaces. The first elements may be identified without using second program code associated with the user interfaces. The first elements may be identified based on a type of the first elements, second text associated with the first elements, or a relationship between the first elements and second elements. The device may identify positions for the first elements. The positions may permit the device to interact with the first elements to perform the test steps. The device may perform the test steps to test the user interfaces.

20 Claims, 9 Drawing Sheets

(56) References Cited

U.S. PATENT DOCUMENTS

| | | | | |
|---|---|---|---|---|
| 9,208,381 | B1* | 12/2015 | Shanmugasundaram | .................... H04L 67/22 |
| 9,317,403 | B2* | 4/2016 | Simons | ............... G06F 11/3684 |
| 9,772,932 | B2* | 9/2017 | Duan | .................. G06F 11/3688 |
| 9,940,223 | B2* | 4/2018 | Tamutzer | ............. G06F 11/3688 |
| 10,235,279 | B2* | 3/2019 | Sadasivam | .......... G06F 11/3688 |
| 2008/0133472 | A1* | 6/2008 | Patterson | .............. G06F 11/368 |
| 2014/0033091 | A1 | 1/2014 | Schein et al. | |
| 2015/0002424 | A1* | 1/2015 | Yamamoto | .......... G06F 3/04883 345/173 |

OTHER PUBLICATIONS

Extended European Search Report corresponding to EP 17 20 7185, dated May 29, 2018, 11 pages.

Wikipedia, "Test automation," https://en.wikipedia.org/wiki/Test_automation, Dec. 28, 2016, 7 pages.

Sikuli, "Sikuli Script," http://www.sikuli.org/, Sep. 21, 2014, 2 pages.

SeleniumHQ, "Selenium WebDriver," http://www.seleniumhq.org/projects/webdriver/, Mar. 11, 2013, 2 pages.

Leotta et al., "Visual vs. DOM-based Web Locators: An Empirical Study," http://dx.doi.org/10.1007/978-3-319-08245-5_19, Jul. 1, 2014, 19 pages.

Hu et al., "Natural Language Object Retrieval," https://pdfs.semanticscholar.org/0794/95c84b68623d9b1d4d48809cc24c1eee0a7e.pdf, Apr. 11, 2016, 14 pages.

Efftinge et al., "Xbase: Implementing Domain-Specific Languages for Java," http://dl.acm.org/citation.cfm?id=2371419, Sep. 26, 2012, 10 pages.

Yandrapally et al., "IBM Research Report: Robust Test Automation Using Contextual Clues," http://dl.acm.org/citation.cfm?id=2610390, Feb. 12, 2014, 19 pages.

* cited by examiner

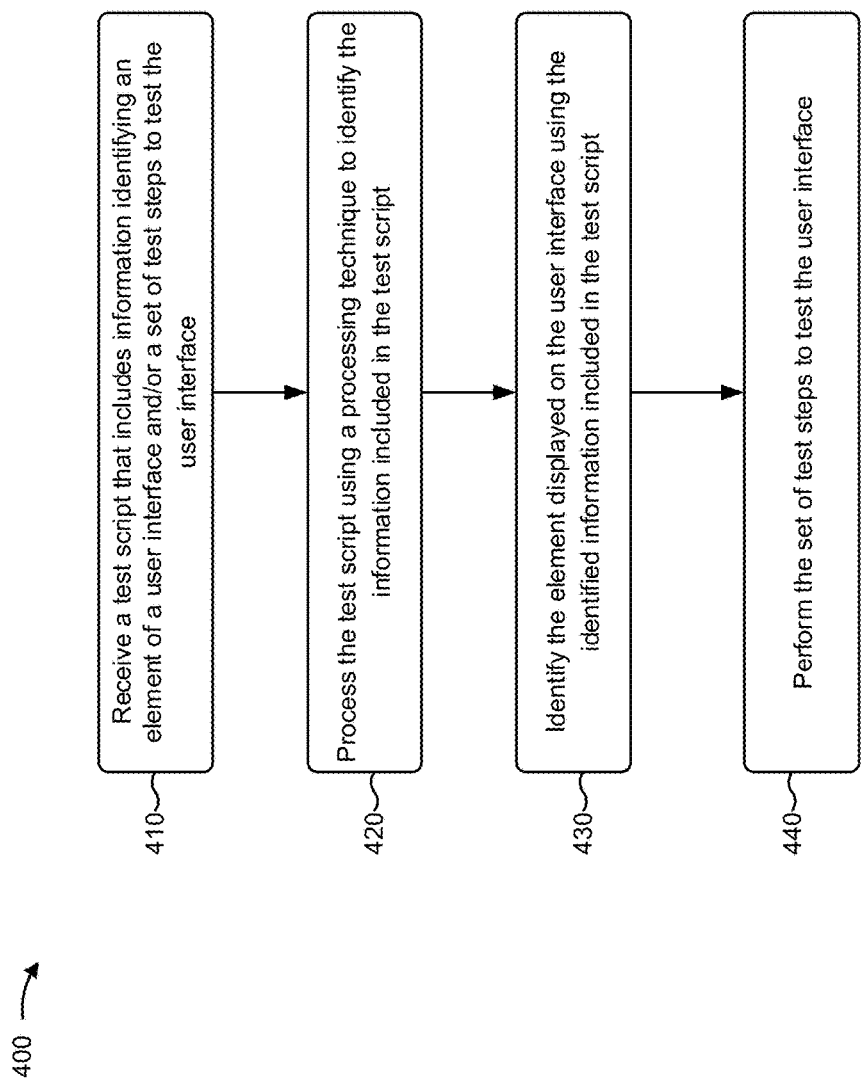

DEVICE BASED VISUAL TEST AUTOMATION

BACKGROUND

Software testing may be performed to test whether software functions as expected. Software testing may be performed manually, or may be automated via test automation. Test automation is the use of special software (separate from the software being tested) to control the execution of tests and the comparison of actual outcomes with predicted outcomes.

SUMMARY

According to some possible implementations, a device may include one or more processors to receive a test script that includes first information identifying a first element to be displayed on a user interface and second information identifying a set of test steps to test the user interface. The test script may be written using first text or first program code. The one or more processors may process the first text or the first program code of the test script using a processing technique to identify the first information and the second information. The one or more processors may identify the first element on the user interface based on identifying the first information and the second information included in the test script. The first element may be identified without using second program code underlying the user interface. The first element may be identified based on a type of the first element, second text associated with the first element, or a visual relationship between the first element and a second element. The one more processors may determine a set of coordinates for the first element on the user interface based on identifying the first element. The set of coordinates may identify a position of the first element on the user interface. The one or more processors may perform the set of test steps to test the user interface based on determining the set of coordinates for the first element. The one or more processors may perform an action related to a result of testing the user interface based on performing the set of test steps.

According to some possible implementations, a method may include receiving, by a device, one or more test scripts that include first information identifying one or more first elements of one or more user interfaces or second information identifying a set of test steps to test the one or more user interfaces. The one or more test scripts may be written in first text or first program code. The method may include processing, by the device, the first text or the first program code of the one or more test scripts to identify the first information or the second information. The method may include identifying, by the device, the one or more first elements on the one or more user interfaces based on identifying the first information or the second information included in the one or more test scripts. The one or more first elements, as displayed on the one or more user interfaces, may be identified without using second program code associated with the one or more user interfaces. The one or more first elements may be identified based on a type of the one or more first elements, second text associated with the one or more first elements, or a relationship between the one or more first elements and one or more second elements. The method may include identifying, by the device, a set of positions for the one or more first elements on the one or more user interfaces based on identifying the one or more first elements. The set of positions may permit the device to interact with the one or more first elements to perform the set of test steps. The method may include performing the set of test steps to test the one or more user interfaces based on identifying the set of positions for the one or more first elements.

According to some possible implementations, a non-transitory computer-readable medium may store one or more instructions that, when executed by one or more processors, cause the one or more processors to receive a plurality of test scripts that include first information identifying a plurality of first elements displayed on a plurality of user interfaces or second information identifying a plurality of test steps to test the plurality of user interfaces. The one or more instructions may cause the one or more processors to process the plurality of test scripts to identify the first information or the second information based on receiving the plurality of test scripts. The one or more instructions may cause the one or more processors to identify the plurality of first elements on the plurality of user interfaces based on identifying the first information or the second information included in the plurality of test scripts. The plurality of first elements may be identified based on a type of the plurality of first elements, text associated with the plurality of first elements, or a relationship between the plurality of first elements and a plurality of second elements. The one or more instructions may cause the one or more processors to identify a set of coordinates for the plurality of first elements on the plurality of user interfaces based on identifying the plurality of first elements. The set of coordinates may identify a position of the plurality of first elements on the plurality of user interfaces. The one or more instructions may cause the one or more processors to perform the plurality of test steps to test the plurality of user interfaces based on identifying the set of coordinates for the plurality of first elements. The one or more instructions may cause the one or more processors to perform a plurality of actions related to the testing of the plurality of user interfaces based on performing the plurality of test steps.

BRIEF DESCRIPTION OF THE DRAWINGS

FIG. 4 is a flow chart of an example process for device-based visual test automation;

DETAILED DESCRIPTION

The following detailed description of example implementations refers to the accompanying drawings. The same reference numbers in different drawings may identify the same or similar elements.

A software tester may desire to test software by automatically interacting with the user interface of the software. However, interacting with a user interface (e.g., testing the user interface) may require knowledge of program code underlying the user interface. In some cases, the tester may not have access to the underlying program code, such as when the software related to the user interface is proprietary to an individual or entity different than the tester. Additionally, or alternatively, the underlying program code may be modified from time to time, such as to modify the user interface, modify functionality related to the user interface, and/or the like. This may cause errors that consume processing resources when automatically interacting with the user interface. In addition, this decreases an efficiency of testing the software by increasing maintenance effort of software used to interact with the user interface.

Implementations described herein provide for automatic interaction with a user interface based on identifying elements displayed by the user interface. In addition, implementations described herein provide for dynamic adjustment of automatic testing based on changes to the manner in which the elements of the user interface are displayed. Further, implementations described herein may interact with a user interface without needing access to the program code underlying the user interface.

In this way, implementations described herein improve automatic testing of software by reducing or eliminating the need for a tester to know, or have access to, program code underlying the user interface. Furthermore, implementations described herein conserve processing resources by reducing or eliminating errors due to changes to the underlying program code, and increase an efficiency of automatic testing by permitting dynamic adjustments to the automatic testing based on changes to the user interface.

Figure 1:
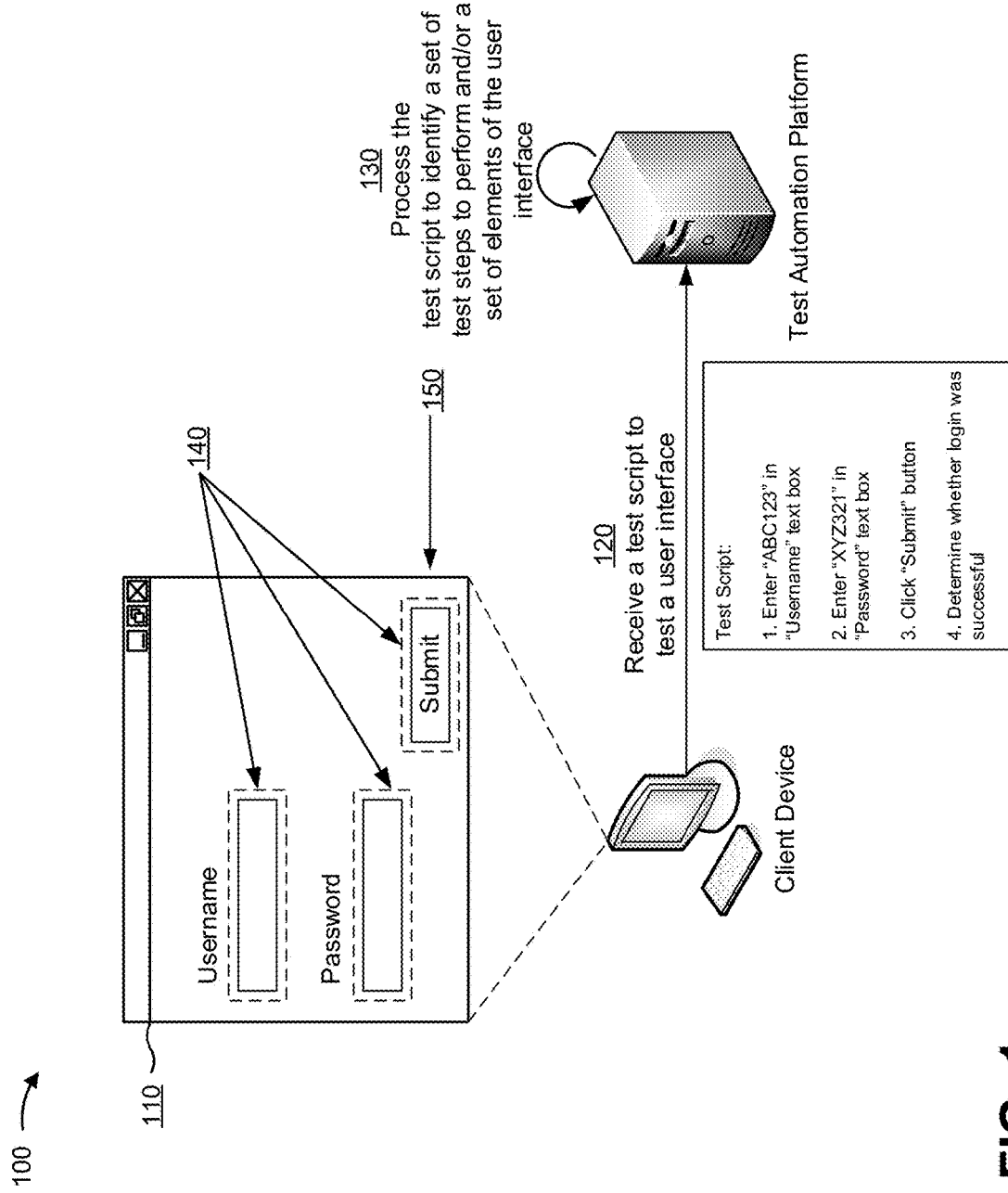
FIG. 1 is a diagram of an overview of an example implementation described herein.

FIG. 1 is a diagram of an overview of an example implementation 100 described herein. As shown in FIG. 1, example implementation 100 may include a test automation platform and a client device. As shown by reference number 110, the client device may display a user interface, the functionality of which is to be tested. For example, the user interface may provide login functionality, where a user of the client device can input a username and password to access information.

As shown by reference number 120, the test automation platform may receive a test script to test software. For example, the test automation platform may receive a set of instructions (e.g., with a natural language syntax, such as a subject-verb-object syntax) to automatically test functionality of the user interface shown by reference number 110. As shown in FIG. 1, for example, the test script may include four test steps that include inputting a username/password combination into various text boxes of the user interface, selecting a button to log in, and determining whether the login was successful (e.g., whether the username/password combination is accepted or generates an error). The test automation platform may receive thousands, millions, or billions of test scripts associated with testing thousands, millions, or billions of elements of user interfaces. Thus, the test automation platform may perform one or more big data techniques to perform the automatic testing.

As shown by reference number 130, the test automation platform may process the test script to identify a set of test steps to perform and/or a set of elements (e.g., a button, a text box, a label, a dropdown menu, etc.) of the user interface on which to perform the set of test steps. For example, the test automation platform may process the test script using natural language processing, computational linguistics, artificial intelligence, and/or the like to identify the set of test steps and/or the set of elements identified in the test script. The test automation platform may identify the set of test steps and/or the set of elements using terms, tags, and/or the like identified when processing the test script. For example, assume that the test automation platform identifies terms or tags identifying a "Username" text box element, a "Password" text box element, and a "Submit" button element in the text of the test script. Further assume, for example, that the test automation platform identifies the test steps of inputting text into the "Username" text box, inputting text into the "Password" text box, and clicking the "Submit" button based on identified terms and/or tags in the text of the test script.

As shown by reference number 140, the test automation platform may then identify the set of elements identified by the test script on the user interface. In some implementations, the test automation platform may identify the set of elements using computer vision, image processing, pattern recognition, machine learning, and/or the like. For example, the test automation platform may identify a text box associated with a "Username" label, a text box associated with a "Password" label, and a "Submit" button as the elements identified in the test script. In this way, the test automation platform may visually identify elements of a user interface based on a visual relationship among elements displayed on the user interface (e.g., identifying that text boxes are displayed on the user interface below labels). This reduces or eliminates the need for the test automation platform to have access to the underlying program code of the user interface to identify an element associated with the user interface. In addition, this permits the test automation platform to dynamically identify an element of the user interface regardless of modifications to the user interface.

Upon identifying the elements on the user interface, the test automation platform may perform the set of test steps identified in the test script by providing input and making selections (e.g., by taking programmatic control of the mouse and/or keyboard functions of the client device) based on the identified elements of the user interface. For example, the test automation platform may input text for a username (e.g., "ABC123") into the text box associated with the "Username" label and may input text for a password (e.g., "XYZ321") into the text box associated with the "Password" label.

As shown by reference number 150, after inputting text for a username into the text box associated with the "Username" label and inputting text for a password into the text box associated with the "Password" label, the test automation platform may select the "Submit" button. In this case, the test automation platform may determine a result of selecting the submit button (e.g., whether the username/password combination provides access to particular information, whether an error message was generated, etc.).

In this way, implementations described herein improve automatic testing of software by reducing or eliminating the need for a tester to know or have access to program code underlying the user interface. Furthermore, implementations described herein conserve processing resources by reducing or eliminating errors due to changes to the underlying program code, and increase an efficiency of automatic testing by permitting dynamic adjustments to the automatic testing based on changes to the user interface.

As indicated above, FIG. 1 is provided merely as an example. Other examples are possible and may differ from what was described with regard to FIG. 1.

Figure 2:
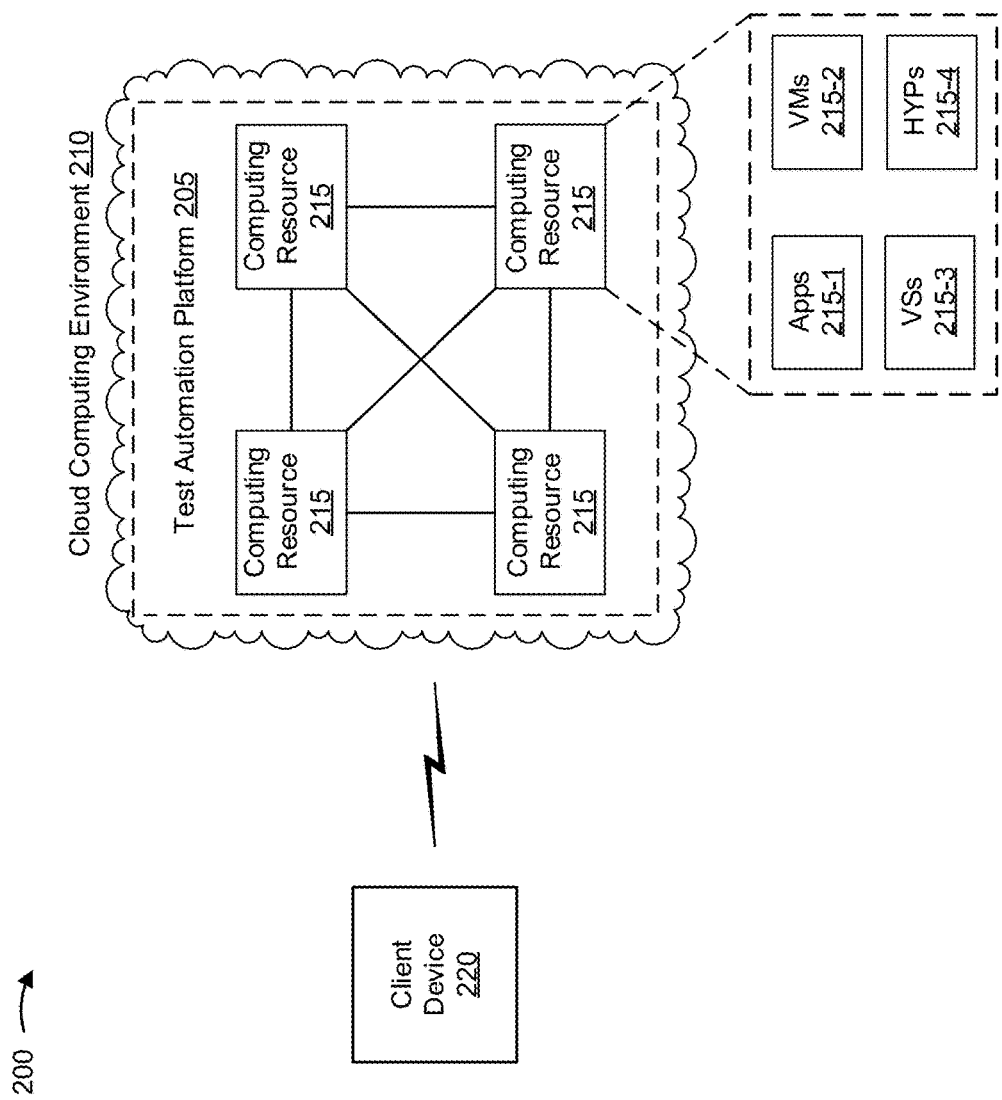
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a test automation platform 205, a cloud computing environment 210, a set computing resources 215 (hereinafter referred to collectively as "computing resources 215" and individually as "computing resource 215"), and a client device 220. Devices of environment 200 may interconnect via wired connections, wireless connections, or a combination of wired and wireless connections.

Test automation platform 205 includes one or more devices capable of visual-based test automation. For example, test automation platform 205 may include a cloud server or a group of cloud servers. In some implementations, test automation platform 205 may be designed to be modular such that certain software components can be swapped in or out depending on a particular need. As such, test automation platform 205 may be easily and/or quickly reconfigured for different uses.

In some implementations, as shown, test automation platform 205 may be hosted in cloud computing environment 210. Notably, while implementations described herein describe test automation platform 205 as being hosted in cloud computing environment 210, in some implementations, test automation platform 205 may not be cloud-based (i.e., may be implemented outside of a cloud computing environment) or may be partially cloud-based.

Cloud computing environment 210 includes an environment that hosts test automation platform 205. Cloud computing environment 210 may provide computation, software, data access, storage, etc. services that do not require end-user (e.g., client device 220) knowledge of a physical location and configuration of system(s) and/or device(s) that host test automation platform 205. As shown, cloud computing environment 210 may include a group of computing resources 215 (referred to collectively as "computing resources 215" and individually as "computing resource 215").

Computing resource 215 includes one or more personal computers, workstation computers, server devices, or other types of computation and/or communication devices. In some implementations, computing resource 215 may host test automation platform 205. The cloud resources may include compute instances executing in computing resource 215, storage devices provided in computing resource 215, data transfer devices provided by computing resource 215, etc. In some implementations, computing resource 215 may communicate with other computing resources 215 via wired connections, wireless connections, or a combination of wired and wireless connections.

As further shown in FIG. 2, computing resource 215 may include a group of cloud resources, such as one or more applications ("APPs") 215-1, one or more virtual machines ("VMs") 215-2, one or more virtualized storages ("VSs") 215-3, or one or more hypervisors ("HYPs") 215-4.

Application 215-1 includes one or more software applications that may be provided to or accessed by one or more devices of environment 200. Application 215-1 may eliminate a need to install and execute the software applications on devices of environment 200. For example, application 215-1 may include software associated with test automation platform 205 and/or any other software capable of being provided via cloud computing environment 210. In some implementations, one application 215-1 may send/receive information to/from one or more other applications 215-1, via virtual machine 215-2.

Virtual machine 215-2 includes a software implementation of a machine (e.g., a computer) that executes programs like a physical machine. Virtual machine 215-2 may be either a system virtual machine or a process virtual machine, depending upon use and degree of correspondence to any real machine by virtual machine 215-2. A system virtual machine may provide a complete system platform that supports execution of a complete operating system ("OS"). A process virtual machine may execute a single program, and may support a single process. In some implementations, virtual machine 215-2 may execute on behalf of a user (e.g., client device 220), and may manage infrastructure of cloud computing environment 210, such as data management, synchronization, or long-duration data transfers.

Virtualized storage 215-3 includes one or more storage systems and/or one or more devices that use virtualization techniques within the storage systems or devices of computing resource 215. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 215-4 may provide hardware virtualization techniques that allow multiple operating systems (e.g., "guest operating systems") to execute concurrently on a host computer, such as computing resource 215. Hypervisor 215-4 may present a virtual operating platform to the guest operating systems, and may manage the execution of the guest operating systems. Multiple instances of a variety of operating systems may share virtualized hardware resources.

Client device 220 includes one or more devices capable of receiving, generating, storing, processing, and/or providing information associated with visual-based test automation. For example, client device 220 may include a communication and/or computing device, such as a desktop computer, a mobile phone (e.g., a smart phone or a radiotelephone), a laptop computer, a tablet computer, a gaming device, a wearable communication device (e.g., a smart wristwatch, a pair of smart eyeglasses, or an activity band), or a similar type of device. In some implementations, client device 220 may provide a test script to test automation platform 205, as described elsewhere herein. Additionally, or alternatively, client device 220 may receive information that indicates a result of a visual-based test of a user interface, as described elsewhere herein.

The number and arrangement of devices shown in FIG. 2 are provided as an example. In practice, there may be additional devices, fewer devices, different devices, or differently arranged devices than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
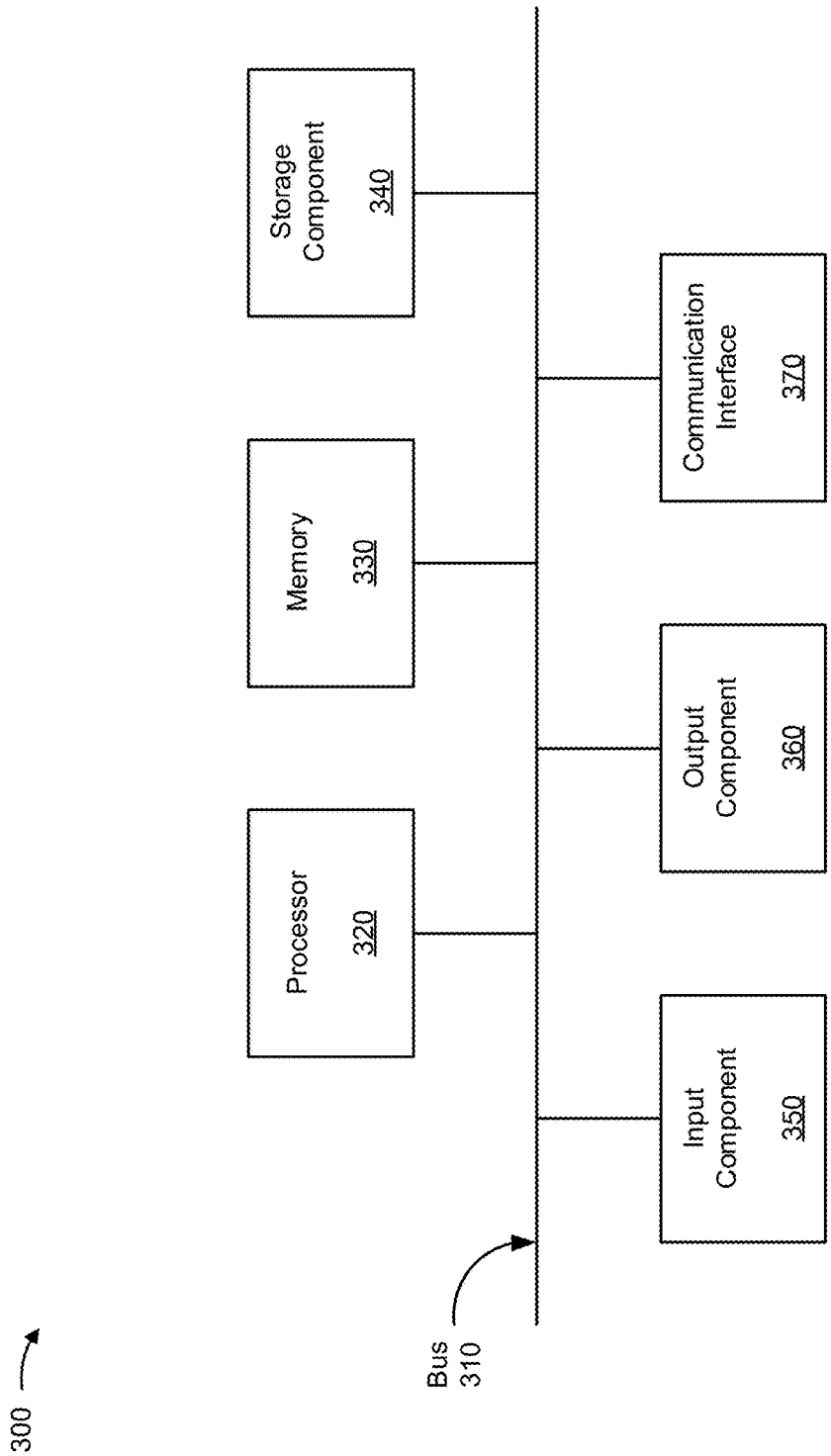
FIG. 3 is a diagram of example components of one or more devices of FIG. 2.

FIG. 3 is a diagram of example components of a device 300. Device 300 may correspond to test automation platform 205, a set of computing resources 215, and/or client device 220. In some implementations, test automation platform 205, a set of computing resources 215, and/or client device 220 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 includes a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

FIG. 4 is a flow chart of an example process 400 for device-based visual test automation. In some implementations, one or more process blocks of FIG. 4 may be performed by test automation platform 205. In some implementations, one or more process blocks of FIG. 4 may be performed by another device or a group of devices separate from or including test automation platform 205, such as client device 220.

As shown in FIG. 4, process 400 may include receiving a test script that includes information identifying an element of a user interface and/or a set of test steps to test the user interface (block 410). For example, test automation platform 205 may receive a test script that includes information identifying an element of a user interface and/or a set of test steps to perform related to testing the user interface. In some implementations, test automation platform 205 may receive the test script periodically, according to a schedule, based on requesting the test script from client device 220, based on input from a user of client device 220, and/or the like.

In some implementations, test automation platform 205 may receive the test script when a user of client device 220 inputs program code and/or text into a code or text editor. Additionally, or alternatively, test automation platform 205 may receive the test script when a user of client device 220 uploads a file that includes program code and/or text to test automation platform 205.

In some implementations, a test script may include a set of test steps (e.g., a set of instructions) to be performed to test functioning of a user interface, a device, software, and/or the like. In some implementations, a test script may identify an action to perform to test the user interface, the device, the software, and/or the like. Additionally, or alternatively, when the test script relates to testing a user interface, a test script may identify an element of the user interface on which an action is to be performed to test the user interface.

In some implementations, an element of a user interface may include a label, a button, a radio button, a menu, a dropdown menu, a text box, a toggle, an icon, a link (e.g., a hyperlink, hypertext, or a uniform resource identifier), and/or the like, that displays information, receives text, controls a functionality of software and/or a device, and/or the like. In some implementations, a user interface may include an interface that enables human-machine interaction, such as a graphical user interface (GUI).

In some implementations, a test script may be written in text. For example, the test script may be written in a text document, a web page, a file, and/or the like. In some implementations, a test script may be written in a natural language (e.g., English), such as using a natural language syntax (e.g., subject-verb-object syntax). In some implementations, a test script may be written in a constrained natural language where a particular term, tag, and/or phrase is used to identify an element of a user interface, functionality of the user interface or software related to the user interface, an action to perform to test the user interface, and/or the like. In this way, test automation platform 205 may quickly and efficiently identify a test step of a test script, an action to perform based on the test step, an element of a user interface on which to perform the action, and/or the like, by parsing text of the test script.

Additionally, or alternatively, a test script may be written in program code. In some implementations, program code may include text-based code that is executed by a device. For example, a test script may be written in Java code, C++, a program code that uses a natural language syntax (e.g., a subject-verb-object syntax), or another type of hardware and/or software based code. In some implementations, particular terms, tags, or phrases of the programming language may be mapped to particular types of elements, actions, and/or the like. In this way, test automation platform 205 may quickly and efficiently identify a test step of a test script, an action to perform based on the test step, an element of a user interface on which to perform the action, and/or the like, by parsing program code for the test script.

In some implementations, a test script may be written in one or more programming languages. For example, a test script may be written in a computer language or constructed language designed to communicate instructions to a machine (e.g., a computer). In some implementations, a test script can be used to create software, such as to control the behavior of a machine and/or to express an algorithm. For example, a test script can be used to create software in Java, C++, Gherkin, a domain-specific language, a natural language programming language that has a natural language syntax, and/or the like. This improves flexibility of test automation platform 205 to receive test scripts in various programming languages.

In some implementations, test automation platform 205 may receive thousands, millions, or billions of test scripts to test thousands, millions, or billions of user interfaces, devices, software programs, and/or the like. In some implementations, the test script may include thousands, millions, or billions or test steps. In some implementations, when the test script is written using program code or text, the test script may include thousands, millions, or billions of lines of program code or lines of text.

In this way, test automation platform 205 may receive a test script that includes information identifying an element of a user interface and/or a set of test steps to test the user interface.

As further shown in FIG. 4, process 400 may include processing the test script using a processing technique to identify the information included in the test script (block 420). For example, test automation platform 205 may process the test script to identify the information included in the test script. In some implementations, test automation platform 205 may process a test script when test automation platform 205 receives the test script from client device 220, based on receiving an indication to process the test script, and/or the like. Additionally, or alternatively, test automation platform 205 may process the test script when test automation platform 205 receives a threshold quantity of test scripts (e.g., test automation platform 205 may batch process multiple test scripts), thereby conserving processing resources and increasing an efficiency of test automation platform 205.

In some implementations, test automation platform 205 may process a test script using a text processing technique. For example, test automation platform 205 may process a test script using natural language processing, computational linguistics, text analysis, machine learning, and/or artificial intelligence to identify the information included in the test script. In some implementations, test automation platform 205 may identify the information by parsing program code and/or text related to the test script. For example, test automation platform 205 may parse the test script to identify a term, a tag, and/or a phrase included in the program code and/or the text of the text script to identify the information.

In some implementations, a term, tag, and/or phrase may identify an action for test automation platform 205 to perform. Additionally, or alternatively, a term, tag, and/or phrase may identify an element of a user interface related to an identified test step (e.g., an element on which test automation platform 205 is to perform an action). For example, assume a test script includes the test step "Enter 'New York' into the text box 'Flying From.'" In this case, test automation platform 205 may parse the test script to identify "Enter" as an action to input text or other data into a text box, and may identify "New York" as the text to input into the text box. Further, test automation platform 205 may determine that the text is to be input into a text box based on identifying the term "text box" in the test script and that the particular text box in which to enter the text is associated with a label on the user interface displaying the text "Flying From."

In this way, test automation platform 205 may process the test script using a processing technique to identify the information included in the test script.

As further shown in FIG. 4, process 400 may include identifying the element displayed on the user interface using the identified information included in the test script (block 430). For example, test automation platform 205 may identify the element on the user interface based on identifying a term, tag, and/or phrase included in the test script that identifies the element.

In some implementations, test automation platform 205 may identify the element using a technique. For example, test automation platform 205 may identify the element using optical character recognition (OCR), image processing, pattern recognition, artificial intelligence, computer vision, a deep neural network, a convolutional neural network (CNN), a long short-term memory network (LSTM), another type of artificial neural network, and/or the like. In some implementations, the technique may permit test automation platform 205 to visually identify an element displayed by a user interface. For example, test automation platform 205 may perform a comparison of an image of the user interface and images of known elements from other user interfaces to identify a button, a text box, a dropdown menu, a label with text, and/or the like displayed on the user interface based on the elements of the user interface having similar features to the other known elements (e.g., based on a machine learning process).

This improves identification of an element displayed on a user interface by reducing or eliminating the need for test automation platform 205 to use the underlying program code of the user interface to identify the element (e.g., via metadata associated with the element, an identifier of the element, etc.). In addition, this enables test automation platform 205 to dynamically identify an element on the user interface regardless of where the element is displayed on the user interface or modifications to where the element is displayed, thereby improving an efficiency of identifying the element.

In some implementations, test automation platform 205 may use OCR, or another technique for converting an image of text into machine-encoded text, to identify text associated with the element. For example, assume that a test script includes a test step of inputting a username into a text box associated with a label that displays the text "Username." In this case, test automation platform 205 may capture a screen shot of the user interface and may use OCR to identify the term "Username," as displayed by a label of the user interface, and may identify a text box associated with the label (e.g., positioned below the label, positioned to the right of the label, positioned at a diagonal to the label, etc.) as the text box for inputting a username. In this way, test automation platform 205 may identify text on the user interface, thereby facilitating testing of the user interface and identification of particular elements of the user interface.

Additionally, or alternatively, test automation platform 205 may use an artificial neural network to identify an element. For example, test automation platform 205 may use a deep neural network to identify an element. In some implementations, test automation platform 205 may use a deep neural network to identify different types of elements (e.g., text boxes, buttons, labels, dropdown menus, etc.) displayed on the user interface. In some implementations, different artificial neural networks may be used to identify particular types of elements. For example, test automation platform 205 may use a first artificial neural network to identify text boxes and a second artificial neural network to identify buttons on a user interface. Additionally, or alternatively, the same artificial neural network may be used to identify various types of elements. For example, test automation platform 205 may use the same artificial neural network to identify text boxes, buttons, labels, and/or the like. In this way, test automation platform 205 may identify various types of elements of a user interface.

In some implementations, test automation platform 205 may use an artificial neural network in combination with another technique to identify a particular element of a user interface. In some implementations, test automation platform 205 may use a deep neural network and OCR to identify a specific element based on text associated with the elements identified using the deep neural network. For example, test automation platform 205 may use a deep neural network to identify various text boxes on the user interface and then may use OCR to identify a particular text box, such as a text box associated with a "Username" label, to identify a particular text box in which to input text for a username. In this way, test automation platform may quickly and efficiently identify a particular element of a user interface, thereby conserving processing resources.

In some implementations, test automation platform 205 may use an artificial neural network to determine a position of an element on the user interface. For example, test automation platform 205 may use a deep neural network trained using images of various elements to identify an element on the user interface. In some implementations, test automation platform 205 may determine coordinates of the element. For example, test automation platform 205 may determine a quantity of pixels or centimeters from an edge of the user interface, or a center of the user interface, that an element is located. In this way, test automation platform 205 may identify a position of an element on a user interface without needing access to the underlying program code of the user interface, thereby increasing an efficiency of identifying the position of the element. In addition, this reduces or eliminates errors due to changes to the user interface and/or the program code underlying the user interface.

In some implementations, test automation platform 205 may identify an element based on a relationship to another element. For example, test automation platform 205 may identify a first element based on a visual relationship to a second element (e.g., based on being displayed above, below, to the right, to the left, at a diagonal, etc. relative to the second element on a user interface). Continuing with the previous example, test automation platform 205 may identify a text box for receiving a username based on the text box being located below a label displaying the text "Username." In this way, test automation platform 205 may identify an element based on a visual relationship of the element to another element.

In some implementations, test automation platform 205 may identify a visual pattern among elements of a user interface to identify a particular element based on a visual relationship to another element. For example, test automation platform 205 may identify a visual pattern among elements of a user interface using an artificial network. Continuing with the previous example, test automation platform 205 may identify a pattern where text boxes are located below corresponding labels based on the layout of the user interface being similar to an annotated user interface in the artificial neural network where text boxes are located below corresponding labels. This permits test automation platform 205 to identify a particular element based on identifying a visual pattern among the elements of a user interface. In this way, test automation platform 205 may identify a visual pattern among elements of a user interface to identify a particular element.

In some implementations, test automation platform 205 may identify horizontal (e.g., x-axis) coordinates and vertical (e.g., y-axis) coordinates of the element on the user interface. For example, test automation platform 205 may determine that an element is located 50 pixels to the right of a bottom left corner of the user interface and 50 pixels up from the bottom left corner of the user interface. In some implementations, the coordinates may identify the center of the element and/or another portion of the element (e.g., a clickable portion of the element, a portion of the element that can receive text, etc.). In this way, test automation platform 205 may identify a portion of an element on which to perform an action.

In some implementations, the artificial neural network used by test automation platform 205 may identify the element based on machine learning, pattern recognition, computer vision, and/or the like. For example, a deep neural network may have been trained using a set of images of user interfaces where the elements of the user interfaces were annotated (e.g., using labels or tags). In some implementations, based on being trained using annotated images of elements, the deep neural network can be used to identify an unannotated element on a user interface. This improves identification of the element by enabling test automation platform 205 to dynamically identify different types of elements, despite variations among elements displayed on different user interfaces.

In this way, test automation platform 205 may identify an element displayed on a user interface using information included in a test script.

As further shown in FIG. 4, process 400 may include performing the set of test steps to test the user interface (block 440). For example, test automation platform 205 may perform a set of actions on a set of elements of a user interface to test the user interface. In some implementations, test automation platform 205 may perform another action, such as an action related to a result of the test of the user interface.

In some implementations, test automation platform 205 may perform an action, such as an action associated with a test step as described in the test script. In some implementations, test automation platform 205 may perform an action related to an element of a user interface. For example, test automation platform 205 may input text into a text box of the user interface, select an option from a menu of the user interface, select a button of the user interface, and/or the like.

In some implementations, test automation platform 205 may perform an action related to a result of the test. In some implementations, test automation platform 205 may determine a result of performing the set of test steps. For example, assuming that test automation platform 205 is testing login functionality of a user interface, test automation platform 205 may determine whether a login attempt was successful or generates an error. Additionally, or alternatively, test automation platform 205 may provide information for display indicating a result of the test or may generate a report that includes information identifying a result of the test.

Additionally, or alternatively, test automation platform 205 may activate an alarm or an alert based on a result of the test. Additionally, or alternatively, test automation platform 205 may send a message (e.g., to a software developer) that includes information identifying a result of the test. In some implementations, when the test is unsuccessful, test automation platform 205 may attempt to identify a source of the unsuccessful test (e.g., by comparing the result to results of other tests).

Additionally, or alternatively, test automation platform 205 may use information related to the test and/or the user interface (e.g., a result of the test, an image of the user interface, etc.) to further train test automation platform 205, such as via machine learning. This improves accuracy of identifying an element of another user interface, thereby conserving processing resources of test automation platform 205. Additionally, or alternatively, test automation platform 205 may provide information related to the test and/or the user interface to another test automation platform 205 to improve accuracy of the other test automation platform 205, thereby conserving processing resources and improving operations of the other test automation platform 205.

Additionally, or alternatively, test automation platform 205 may record a video of the test and isolate a portion of the video (e.g., related to an error during the test). In some implementations, when test automation platform 205 has isolated a portion of the video, test automation platform 205 may provide (e.g., store/send) the isolated portion of the video to facilitate (permit) fixing of the error.

Additionally, or alternatively, test automation platform 205 may schedule a meeting for members of a development team (e.g., by identifying an available time using electronic calendars of the members of the development team). Additionally, or alternatively, test automation platform 205 may submit program code of the user interface for automatic analysis with information identifying various portions of the program code that may need particular scrutiny (e.g., due to causing an error during execution of the program code).

In some implementations, test automation platform 205 may use a program to perform the action. For example, test automation platform 205 may take programmatic control of a mouse and/or keyboard, such as by using a Java robot class to input text into a text box, click on a button, and/or the like. In this way, test automation platform 205 may automatically emulate use of a user interface by a user.

In this way, test automation platform 205 may perform the set of test steps to test the user interface.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5A:
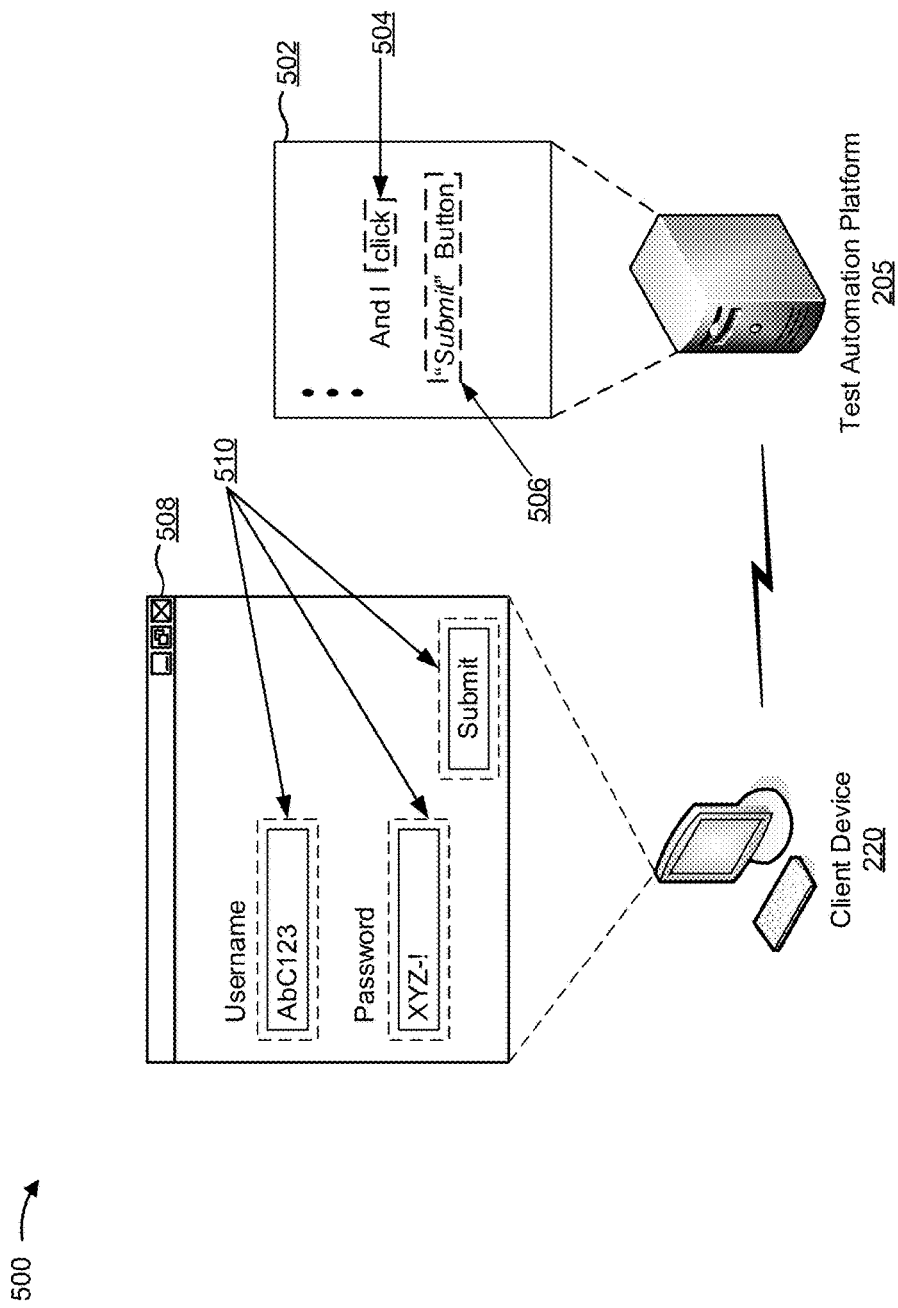
FIGS. 5A-5D are diagrams of an example implementation relating to the example process shown in FIG. 4.
Figure 5B:
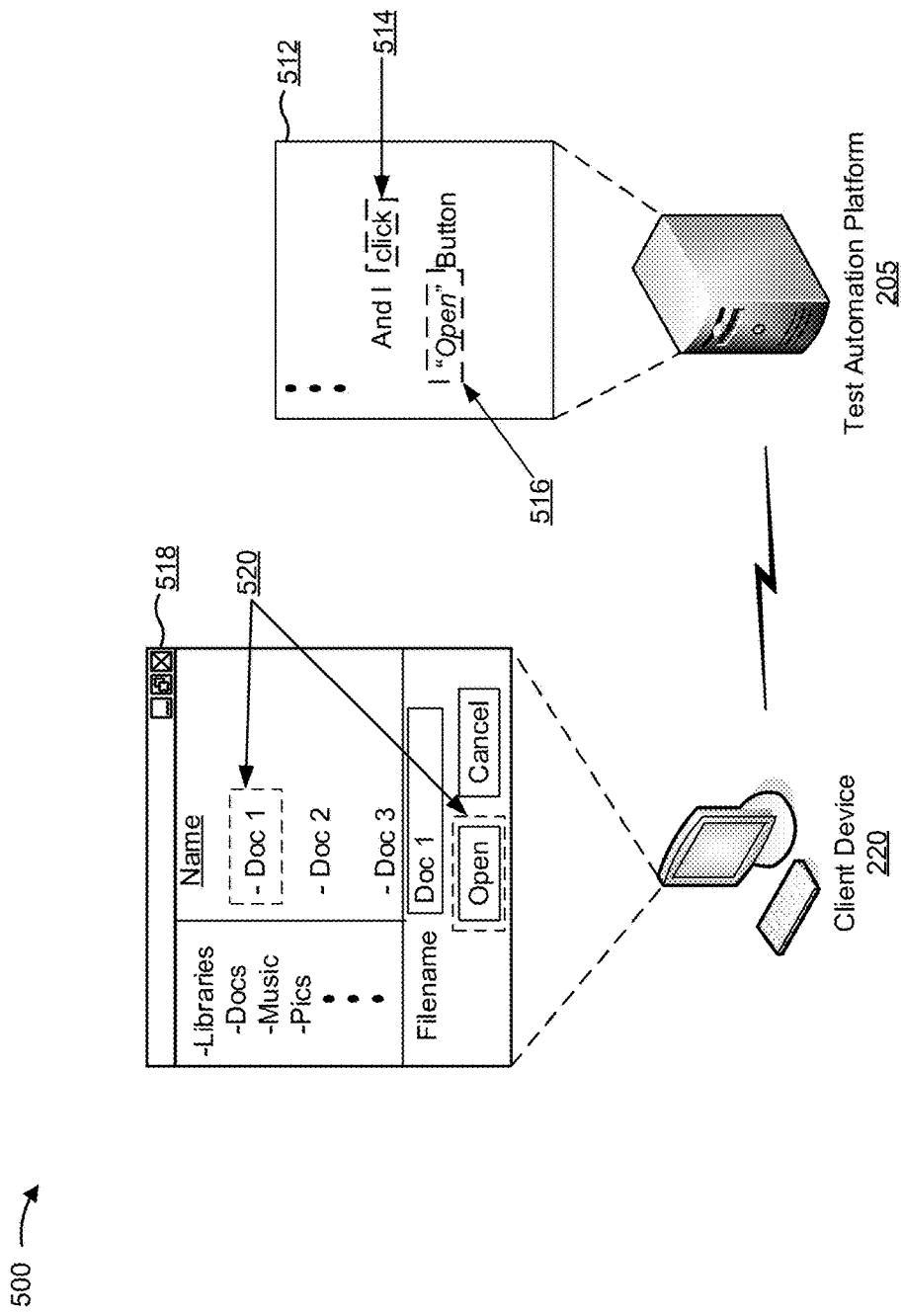
Figure 5C:
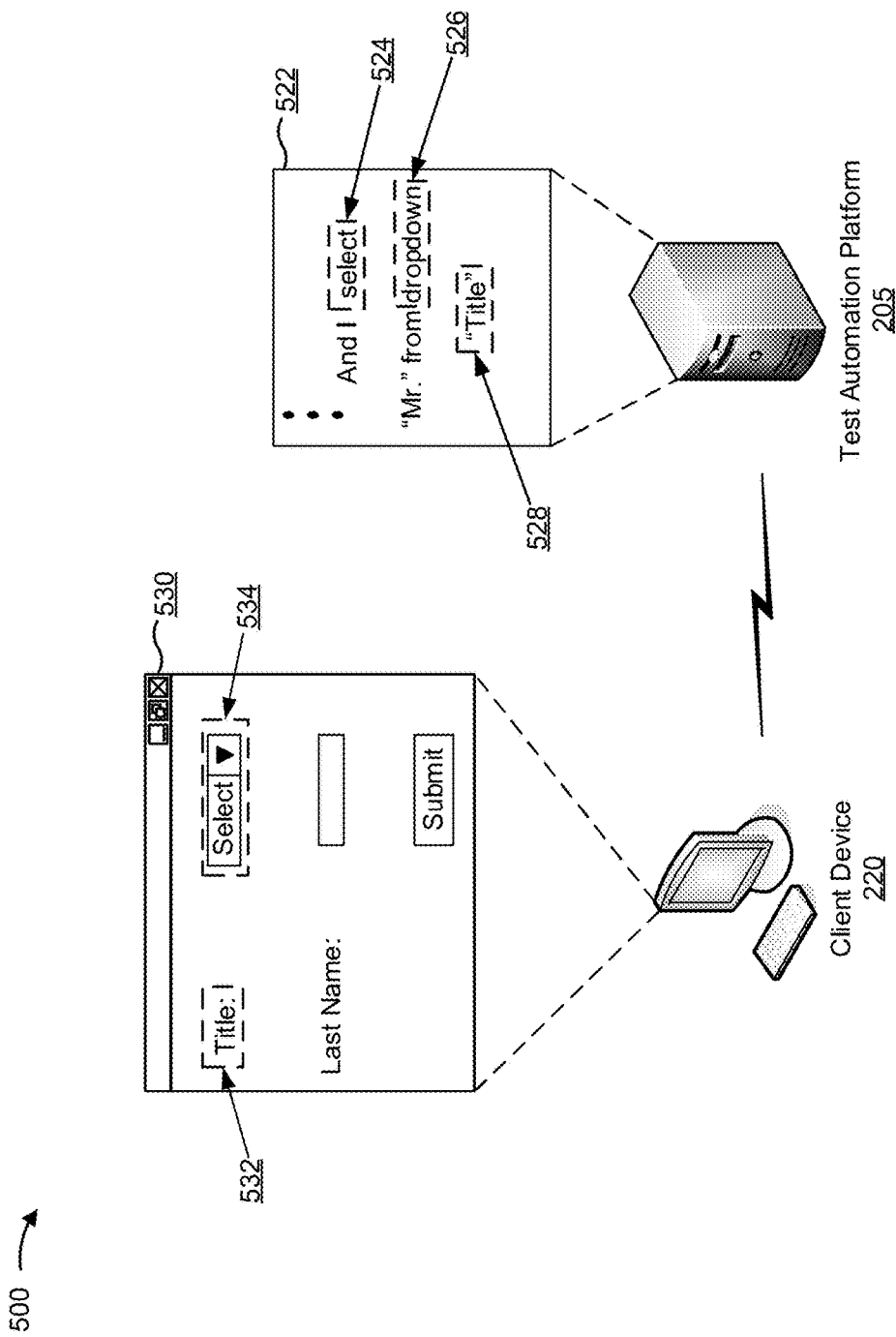
Figure 5D:
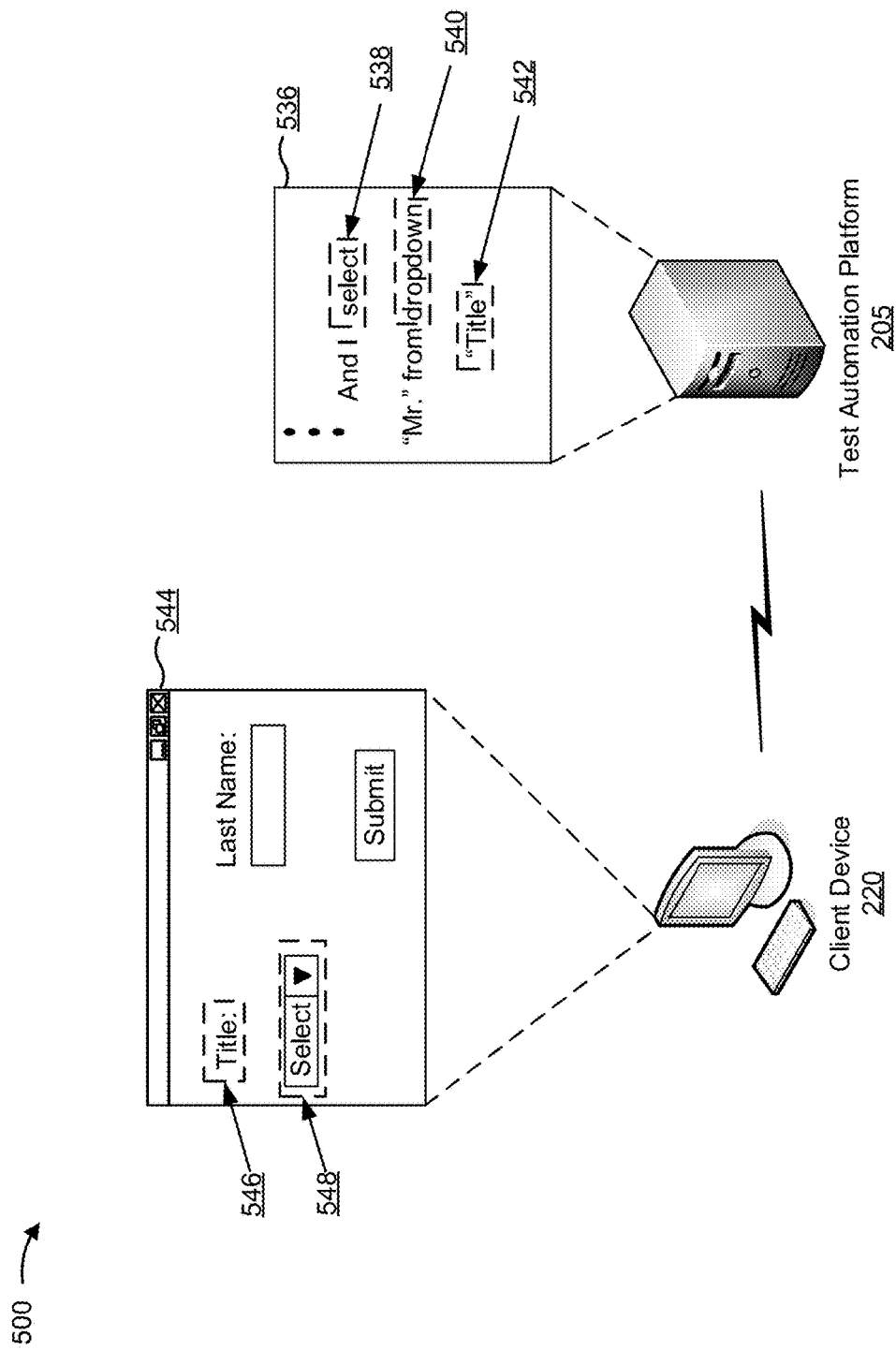

FIGS. 5A-5D are diagrams of an example implementation 500 relating to example process 400 shown in FIG. 4. FIGS. 5A-5D show an example of device-based visual test automation. FIGS. 5A and 5B show test automation platform 205 dynamically testing different types of user interfaces. FIGS. 5C and 5D show that test automation platform 205 can dynamically adjust testing of a user interface when the user interface is modified.

As shown in FIG. 5A, example implementation 500 includes test automation platform 205 and client device 220. As shown by reference number 502, test automation platform 205 may have a test script (e.g., received from client device 220). As shown by reference numbers 504 and 506, test automation platform 205 may parse the test script to identify terms, tags, and/or phrases that identify actions of the test script and/or elements of a user interface on which to perform the actions. In this case, test automation platform 205 may identify "click" as an action (shown by reference number 504) and "'Submit' Button" as an element of a user interface associated with the action (shown by reference number 506).

As shown by reference number 508, test automation platform 205 may then identify the elements on a web-based user interface. For example, test automation platform 205 may identify a text box associated with a "Username" label, another text box associated with a "Password" label, and a "Submit" button displayed by the user interface. As shown by reference number 510, test automation platform 205 may then perform various actions related to the identified elements, such as inputting text into various text boxes and selecting a "Submit" button to cause the text to be processed. For example, test automation platform 205 may select the "Submit" button based on interpreting the term "click" in the test script as identifying a selection action and the phrase "'Submit' Button" as identifying a button element that displays the text "Submit."

In this way, by automatically identifying elements of the user interface based on the test script, test automation platform 205 enables a tester to create test scripts to test a web-based user interface without knowledge of implementation details or underlying program code for the user interface.

As shown in FIG. 5B, and by reference number 512, test automation platform 205 may have a test script (e.g., received from client device 220). As shown by reference numbers 514 and 516, test automation platform 205 may parse the test script to identify a term, a tag, and/or a phrase that identifies an action to perform and/or an element of a user interface on which to perform the action. In this case, test automation platform 205 may identify "click" as an action (shown by reference number 514) and "'Open' Button" as an element (shown by reference number 516) on which to perform the identified action.

As shown by reference number 518, test automation platform 205 may identify the elements on a non-web based user interface (e.g., a user interface of a file browser). As shown by reference number 520, test automation platform 205 may perform various actions, such as selecting a document from a list of documents and selecting an "Open" button to open the document. For example, test automation platform 205 may select the "Open" button based on interpreting the action "click" as identifying a selection action and the phrase "'Open' Button" as identifying the element to select.

In this way, test automation platform 205 enables a tester to create test scripts for non-web based user interfaces, without needing access to the underlying program code of the user interface.

As shown in FIG. 5C, and by reference number 522, test automation platform 205 may have a test script (e.g., received from client device 220). As shown by reference numbers 524 through 528, test automation platform 205 may parse the test script to identify various terms, tags, and/or phrases that identify various actions of test script and/or elements of a user interface on which to perform the actions. For example, test automation platform 205 may identify "select" as identifying a selection action (shown by reference number 524), may identify "dropdown" (shown by reference number 526) as identifying a dropdown menu element, and may identify "Title" (shown by reference number 528) as identifying text of a label associated with the dropdown element.

As shown by reference number 530, test automation platform 205 may identify the elements identified in the test script on a user interface. As shown by reference number 532, test automation platform 205 may identify "Title," such as by identifying the word "Title" using OCR to identify text displayed by the user interface. As shown by reference number 534, although the dropdown menu does not display text identifying the dropdown menu as the "Title" dropdown menu, test automation platform 205 may identify the dropdown menu based on a visual relationship to another element (e.g., based on being displayed to the right of the label with text "Title").

In this way, test automation platform 205 may identify an element of a user interface based on a visual relationship of the element to another element. This improves testing by reducing or eliminating a need for knowledge of implementation details of the user interface or the program code underlying the user interface.

As shown in FIG. 5D, and by reference number 536, test automation platform 205 may have a test script (e.g., received from client device 220). As shown by reference numbers 538 through 542, test automation platform 205 may parse the test script to identify various terms, tags, and/or phrases that identify various actions to perform and/or various elements of a user interface on which to perform the various actions. For example, assuming that the information in the test script is the same as in FIG. 5C, test automation platform 205 may identify the term "select" (shown by reference number 538) as identifying a selection action, the term "dropdown" (shown by reference number 540) as identifying a dropdown menu element, and the term "Title" (shown by reference number 542) as identifying text of a label associated with the dropdown menu, in a manner similar to that described above with respect to FIG. 5C.

As shown by reference number 544, test automation platform 205 may identify the elements on a user interface. In this case, the user interface includes the same elements as shown by reference number 530 in FIG. 5C, but the elements are positioned in a different manner than the user interface in FIG. 5C. As shown by reference number 546, test automation platform 205 may identify a label with the text "Title" on the user interface, such as by recognizing the word "Title" using OCR. As shown by reference number 548, although the dropdown menu does not display text identifying the dropdown menu as the "Title" dropdown menu, test automation platform 205 may identify the dropdown menu as the "Title" dropdown menu based on a visual relationship to another element (e.g., based on being displayed below a label with text "Title"). As the method of identifying an element is not based on program code or expressly defined information associated with the user interface, such as information identifying a specific location of an element, repositioning of the elements does not prevent test automation platform 205 from using the same test script to identify the elements of the user interface when the elements are rearranged.

In this way, test automation platform 205 may identify an element of a user interface based on a visual relationship of the element to another element. This improves testing by reducing or eliminating a need for knowledge of implementation details of the user interface or the program code underlying the user interface. As a result, if elements on a user interface are rearranged, test automation platform 205 may still correctly identify the element on the user interface. This reduces maintenance effort related to automated testing and increases flexibility of automated testing. This conserves processing resources of test automation platform 205 that would be used to ineffectively test a user interface that has been modified.

As indicated above, FIGS. 5A-5D are provided merely as examples. Other examples are possible and may differ from what was described with regard to FIGS. 5A-5D.

Figure 6:
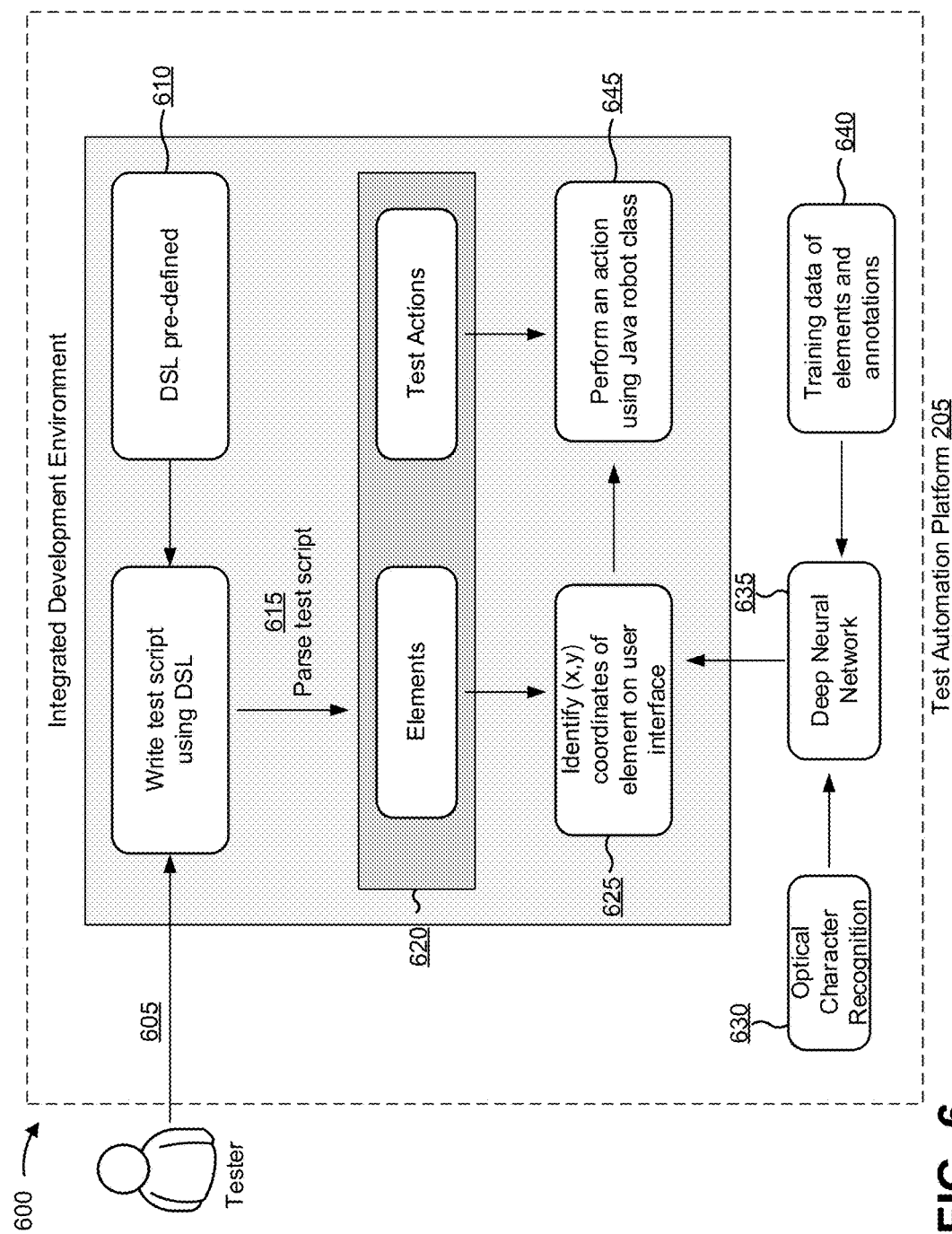
FIG. 6 is a diagram of an example implementation relating to the example process shown in FIG. 4.

FIG. 6 is a diagram of an example implementation 600 relating to example process 400 shown in FIG. 4. FIG. 6 shows an example implementation of device-based visual test automation.

As shown in FIG. 6, example implementation 600 includes test automation platform 205, which may utilize an Integrated Development Environment (IDE), such as Eclipse IDE.

As shown by reference number 605, test automation platform 205 may receive a test script when a tester writes the test script (e.g., utilizing the IDE). For example, the tester may write the test script using a domain-specific language (DSL). In some implementations, and as shown by reference number 610, the DSL may be pre-defined. For example, various terms, tags, phrases, and/or the like, may be mapped to various actions, elements, and/or the like, such that test automation platform 205 may identify various actions to perform and/or the elements on which to perform the actions by identifying the various terms, tags, and/or phrases included in the test script.

As shown by reference number 615, test automation platform 205 may parse the test script, as described above. For example, test automation platform 205 may parse the test script to identify a term, a tag, or a phrase included in the test script. In some implementations, and as shown by reference number 620, test automation platform 205 may identify elements and/or test actions identified by the test script based on parsing the test script.

As shown by reference number 625, test automation platform 205 may identify coordinates (e.g., x, y coordinates) of elements on the user interface (as described above). In some implementations, as shown by reference number 630, test automation platform 205 may identify elements using optical character recognition. Additionally, or alternatively, as shown by reference number 635, test automation platform 205 may identify elements using a deep neural network that can identify similarities between elements of a user interface and elements of other user interfaces. As shown by reference number 640, the deep neural network may have been trained using training data that includes images of elements and annotations that identify the type of elements shown in the images.

As shown by reference number 645, test automation platform 205 may perform an action based on the identified test actions and elements using a Java robot class, or another program or application that can replicate actions of a computer user, such as inputting text, clicking a button, selecting a menu item, and/or the like.

In this way, test automation platform 205 may receive a test script and interact with a user interface based on the test script.

As indicated above, FIG. 6 is provided merely as an example. Other examples are possible and may differ from what was described with regard to FIG. 6.

Implementations described herein enable a test automation platform to automatically interact with a user interface based on identifying elements displayed by the user interface. Furthermore, implementations described herein enable the test automation platform to dynamically adjust automatic testing based on changes to the manner in which elements of the user interface are displayed.

In this way, implementations described herein improve automatic testing of software by reducing or eliminating the need for a test automation platform to know or have access to program code underlying the user interface. Furthermore, implementations described herein conserve processing resources by reducing or eliminating errors due to changes to the underlying program code, and increase an efficiency of automatic testing by permitting dynamic adjustments to the automatic testing based on changes to the user interface.

Although implementations described herein are described in the context of software testing, the implementations may relate to other contexts. For example, the implementations may relate to process automation, virtual agents, and/or the like.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

Certain user interfaces have been described herein and/or shown in the figures. A user interface may include a graphical user interface, a non-graphical user interface, a text-based user interface, etc. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
   receiving, by a device, one or more test scripts that include first information identifying one or more first elements of one or more user interfaces or second information identifying a set of test steps to test the one or more user interfaces,
      the one or more test scripts being written in first text or first program code;
   processing, by the device, the first text or the first program code of the one or more test scripts to identify the first information or the second information;
   obtaining, by the device, one or more images of the one or more user interfaces as displayed by another device after processing the first text or the first program code;
   identifying one or more labels displayed on the one or more user interfaces using optical character recognition to process the one or more images;
   identifying, by the device, the one or more first elements on the one or more user interfaces based on identifying the one or more labels,
      the one or more first elements, as displayed on the one or more user interfaces, being identified without using second program code associated with the one or more user interfaces;
   identifying, by the device, a set of positions for the one or more first elements on the one or more user interfaces based on identifying the one or more first elements,
      the set of positions permitting the device to interact with the one or more first elements to perform the set of test steps; and
   performing, by the device, the set of test steps to test the one or more user interfaces based on identifying the set of positions for the one or more first elements.

2. The method of claim 1, further comprising:
training an artificial neural network with one or more images of one or more other user interfaces,
elements of the one or more other user interfaces being a same type as the one or more first elements; and
where identifying the one or more first elements further comprises:
identifying the one or more first elements based on training the artificial neural network with the one or more images.

3. The method of claim 1, where identifying the one or more first elements further comprises:
identifying the one or more first elements using a combination of an artificial neural network and the optical character recognition,
the artificial neural network being used to identify a plurality of first elements that includes the one or more first elements,
the optical character recognition being used to identify the one or more first elements from among the plurality of first elements.

4. The method of claim 1, where the set of positions identifies a horizontal position and a vertical position of the one or more first elements on the one or more user interfaces.

5. The method of claim 1, where identifying the one or more first elements on the one or more user interfaces further comprises:
identifying a first element on a first user interface and a second user interface based on identifying the first information or the second information included in the one or more test scripts,
a first position of the first element on the first user interface being different than a second position of the first element on the second user interface.

6. The method of claim 1, further comprising:
determining a result of performing the set of test steps based on performing the set of test steps; and
generating a report that includes information identifying the result based on determining the result.

7. The method of claim 1, further comprising:
obtaining programmatic control of a component of another device; and
where performing the set of test steps comprises:
performing the set of test steps based on obtaining programmatic control of the component.

8. A device, comprising:
one or more processors, implemented at least partially in hardware, to:
receive a test script that includes first information identifying a first element to be displayed on a user interface and second information identifying a set of test steps to test the user interface,
the test script being written using first text or first program code;
process the first text or the first program code of the test script using a processing technique to identify the first information and the second information;
identify a label displayed on the user interface using optical character recognition (OCR) based on processing the first text or the first program code,
the label displaying second text;
identify the first element on the user interface based on identifying the label displayed on the user interface,
the first element being identified without using second program code underlying the user interface;
determine a set of coordinates for the first element on the user interface based on identifying the first element,
the set of coordinates identifying a position of the first element on the user interface;
perform the set of test steps to test the user interface based on determining the set of coordinates for the first element; and
perform an action related to a result of testing the user interface based on performing the set of test steps.

9. The device of claim 8, where the one or more processors, when processing the first text or the first program code of the test script, are to:
process the first text or the first program code of the test script to identify a term, a tag, or a phrase related to the first element or the set of test steps based on receiving the test script,
the term, the tag, or the phrase identifying the first element or a test step of the set of test steps; and
where the one or more processors, when identifying the first element on the user interface, are further to:
identify the first element on the user interface based on identifying the term, the tag, or the phrase that identifies the first element.

10. The device of claim 9, where the one or more processors are further to:
determine an action to perform for the test step based on identifying the term, the tag, or the phrase that identifies the test step of the set of test steps; and
where the one or more processors, when performing the set of test steps, are to:
perform the set of test steps based on determining the action to perform for the test step.

11. The device of claim 8, where the one or more processors are further to:
use an artificial neural network to identify multiple elements of a same type as the first element based on processing the first text or the first program code,
the first element being included in the multiple elements; and
where the one or more processors, when identifying the first element, are further to:
identify the first element based on using the artificial neural network to identify the multiple elements.

12. The device of claim 8, where the one or more processors, when identifying the first element, are further to:
identify the first element based on a visual relationship between the first element and a second element, the visual relationship between the first element and the second element including:
the first element being displayed above the second element,
the first element being displayed below the second element,
the first element being displayed on a left side of the second element,
the first element being displayed on a right side of the second element, or
the first element being displayed on a diagonal to the second element.

13. The device of claim 8, where the action includes:
using information related to the user interface or related to performing the set of test steps as a training set based on performing the set of test steps; and
identifying a third element of another user interface based on using the information as the training set.

14. The device of claim 8, wherein the one or more processors are further to:
obtain one or more images of the user interface as displayed by another device after processing the first text or the first program code, and
wherein the one or more processors, when identifying the label, are further to:
identify the label based on the one or more images.

15. A non-transitory computer-readable medium storing instructions, the instructions comprising:
one or more instructions that, when executed by one or more processors, cause the one or more processors to:
receive a plurality of test scripts that include first information identifying a plurality of first elements displayed on a plurality of user interfaces or second information identifying a plurality of test steps to test the plurality of user interfaces;
process the plurality of test scripts to identify the first information or the second information based on receiving the plurality of test scripts;
identify one or more labels displayed on the plurality of user interfaces using optical character recognition (OCR) based on processing the plurality of test scripts or the second information,
the one or more labels displaying text;
identify the plurality of first elements on the plurality of user interfaces based on identifying the one or more labels,
the plurality of first elements being identified without using program code underlying the plurality of user interfaces;
identify a set of coordinates for the plurality of first elements on the plurality of user interfaces based on identifying the plurality of first elements,
the set of coordinates identifying a position of the plurality of first elements on the plurality of user interfaces;
perform the plurality of test steps to test the plurality of user interfaces based on identifying the set of coordinates for the plurality of first elements; and
perform a plurality of actions related to the testing of the plurality of user interfaces based on performing the plurality of test steps.

16. The non-transitory computer-readable medium of claim 15, where the one or more instructions, that cause the one or more processors to identify the plurality of first elements, further cause the one or more processors to:
identify the plurality of first elements using an artificial neural network based on processing the plurality of test scripts; and
where the one or more instructions, when executed by the one or more processors, further cause the one or more processors to:
identify label text displayed on a label, of the one or more labels, on a user interface, of the plurality of user interfaces, based on identifying the plurality of first elements; and
identify a particular element, of the plurality of first elements, based on identifying the label text displayed on the user interface.

17. The non-transitory computer-readable medium of claim 15, where the one or more instructions, when executed by the one or more processors, further cause the one or more processors to:
obtain programmatic control of a component of a device based on identifying the set of coordinates for the plurality of first elements; and
where the one or more instructions, that cause the one or more processors to perform the plurality of test steps, cause the one or more processors to:
perform the plurality of test steps based on obtaining programmatic control of the component.

18. The non-transitory computer-readable medium of claim 15, where the one or more instructions, when executed by the one or more processors, further cause the one or more processors to:
identify a plurality of terms, a plurality of tags, or a plurality of phrases included in the plurality of test scripts,
the plurality of terms, the plurality of tags, or the plurality of phrases identifying the first information or the second information; and
where the one or more instructions, that cause the one or more processors to identify the plurality of first elements, further cause the one or more processors to:
identify the plurality of first elements based on identifying the plurality of terms, the plurality of tags, or the plurality of phrases.

19. The non-transitory computer-readable medium of claim 15, where the plurality of first elements includes:
a plurality of textboxes,
a plurality of buttons,
a plurality of dropdown menus,
a plurality of radio buttons, or
a plurality of links.

20. The non-transitory computer-readable medium of claim 15, where the plurality of actions includes:
providing a message to a device indicating a result of performing the plurality of test steps.

* * * * *